J. C. PRIMS.
STEAM COOKER.
APPLICATION FILED JULY 3, 1908.
951,452.
Patented Mar. 8, 1910.
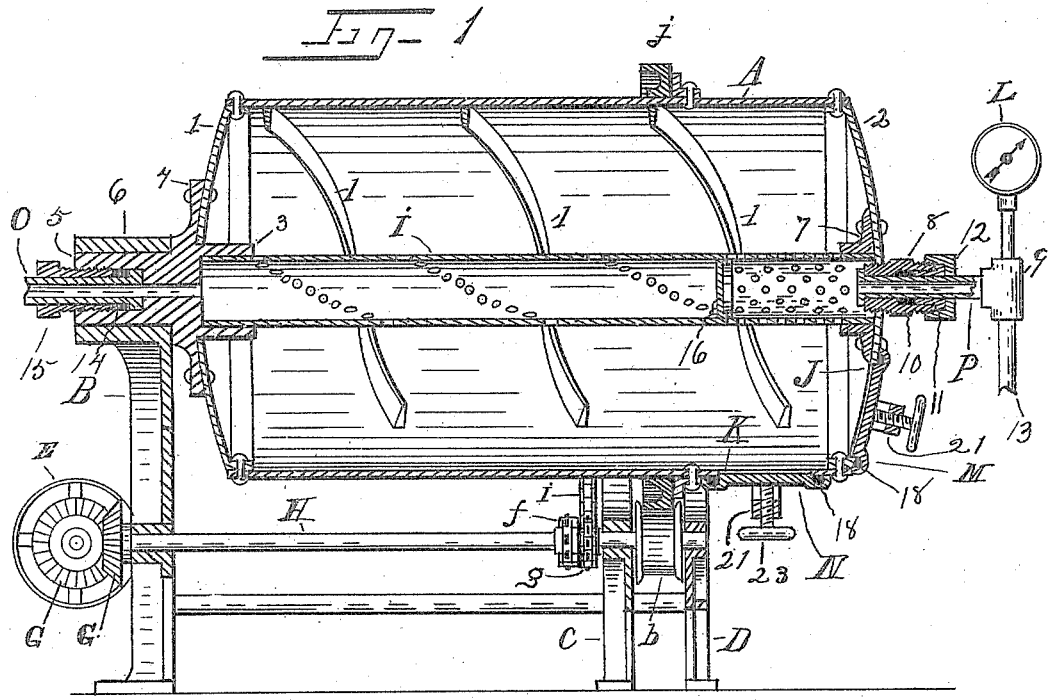
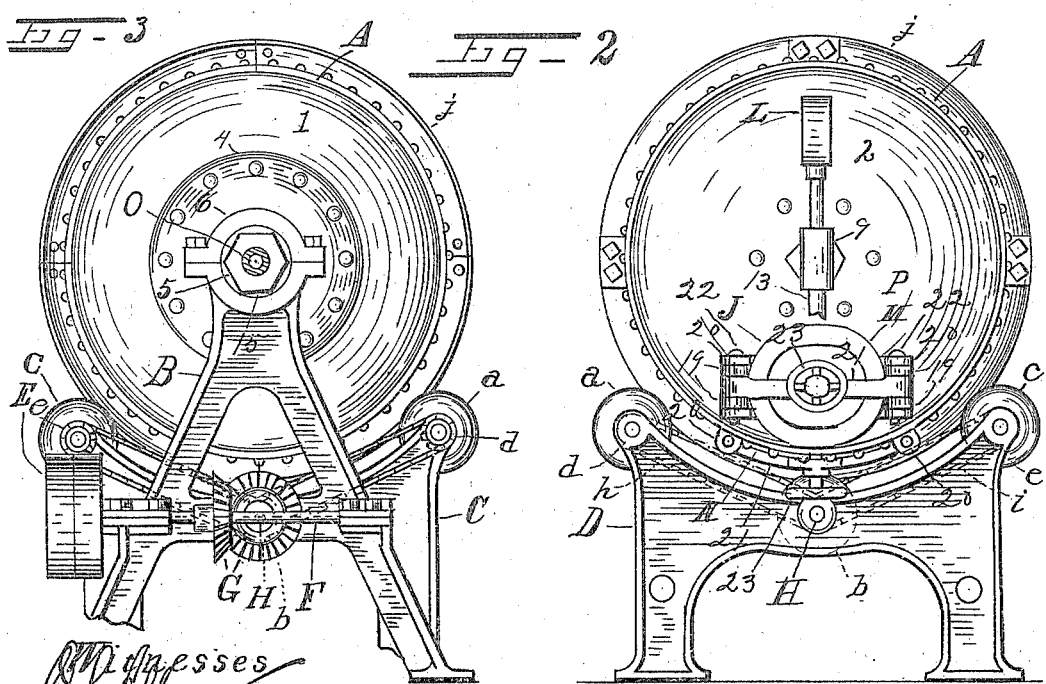
Witnesses
Jas. W. Lewis.
Inventor:
Josef C. Prims
By Victor E. Randall

UNITED STATES PATENT OFFICE.

JOSEF C. PRIMS, OF BATTLE CREEK, MICHIGAN, ASSIGNOR TO PRIMS MACHINERY COMPANY, OF BATTLE CREEK, MICHIGAN.

STEAM-COOKER.

951,452.   Specification of Letters Patent.   Patented Mar. 8, 1910.

Application filed July 3, 1908. Serial No. 441,762.

*To all whom it may concern:*

Be it known that I, JOSEF C. PRIMS, a citizen of the United States, residing at Battle Creek, in the county of Calhoun and State of Michigan, have invented certain new and useful Improvements in Steam-Cookers, of which the following is a specification.

My invention relates to steam cookers more especially designed for cooking cereal products for food, and the object of the invention is to construct a cooker that will be simple in construction, economical to manufacture, and one whereby cooking will be facilitated, and speed, cleanliness and economy be assured.

Other objects and advantages will hereinafter appear from the following specification and the drawings accompanying the same, which form a part thereof, and as will be more particularly set forth in the claims following the specification.

In the drawings, Figure 1, is a longitudinal section of my improved steam cooker. Fig. 2, is a front end elevation, and Fig. 3, is a rear end elevation.

Like marks of reference refer to corresponding parts throughout the different views, in which—

A, represents the shell or body; B, C, D, the frame; E, the belt wheels to the cross shaft F; G, G, bevel gears adapted to drive the longitudinal shaft H; *a, b* and *c*, grooved rollers mounted on journals between the frame parts C and D and having sprocket gears *d, e, f* and *g;* the sprockets *f* and *g* being mounted on the drive shaft H, the sprockets *d* and *f* being connected by the sprocket chain *h*, and the sprockets *e* and *g* by the sprocket chain, *i*.

The cooker comprises the cylindrical body, A, with riveted-in heads, 1 and 2, axially supported at one end by a trunnion, 5, mounted in a journal, 6, of the frame, B. The opposite end of the cooker is provided with an encircling race, *j*, adapted to rest or ride on the grooved rollers *a, b* and *c*. The head of the cooker opposite the trunnion is provided with a manhole, J, near one edge thereof, and a filling and discharge opening, K, immediately opposite and within the outer shell or casing, both the manhole and discharge openings being fitted with steam tight gaskets M—N, hereinafter more fully set forth. Fitted between the heads 1 and 2 and axially alined with the cylinder is a steam distributing tube, I.

O, represents a steam intake pipe through the axis or trunnion, 5, which admits steam to the distributing tube, and P is the outtake or exhaust pipe to which the steam gage, L, may be attached.

Interiorly of the cylindrical body a series of spiral vanes or ribs, I, are secured to the shell. These ribs extend but partially about the cooker, a space longitudinal on one side thereof and in alinement with the manhole and discharge openings being left free from obstruction to permit the contents of the cooker to be easily removed.

The head, 1, is fitted with a casting comprising an internally-extending cup, 3, adapted to receive one end of the steam distributing tube, I, an annular flange, 4, to which the head is riveted, and an outwardly-extending portion, 5, forming a trunnion or axle adapted to support this end of the cooker, the same rolling in the bearing, 6, of the frame B. The head, 2, is fitted with an internal collar, 7, within which one end of the steam-distributing tube, I, is fitted. Axially to this head the same is bored and screw-threaded and fitted with a plug, 8; this plug receives the steam exhaust or take-off pipe, P, the inner end of which is flared to form a collar to prevent longitudinal displacement, the opposite end being fitted within the T coupling 9. The outer end of the plug, 8, is bored out to receive a gasket, 10, and a packing gland, 11; externally it is screw-threaded and receives the collar, 12, adapted to bear against the gland, 11, and make the joint steam tight.

Screwed into the T coupling 9 is the steam-indicating gage, L, and an off-take pipe, 13, said pipe adapted to have a globe or other valve by which steam may be retained or discharged from the cooker, as the operator may elect. In the opposite end of the cooker the trunnion, 5, is bored and forms a communication with the steam-distributing tube, I. The outer end of the trunnion is chambered out and screw-threaded and within the chambered-out portion the steam intake pipe, O, is received. This pipe has an enlarged head against which an annular gasket, 14, is fitted, and bearing against this gasket a packing nut, 15, is screw-fitted.

The steam-distributing tube, I, near the end opposite from which steam is admitted is fitted with a wall or partition, 16, the intake portion of the tube being perforated at intervals, and preferably in spiral alinement, as shown. The end of the tube opposite the partition is closely perforated and forms a sieve or screen affording an outlet when it is desired to draw the steam from the cooker.

Both the manhole, J, and the discharge opening, K, are identical in construction and equipment. The covers have gaskets about their edges fitted with steam-tight packing, 18, adapted to bear against the body of the cooker to form a hermetically-sealed joint when closed. At opposite sides of both the manhole, and the discharge opening, ears, 19, on oppositely-disposed sides of the respective openings are provided, which in turn receive ears, 20, on the respective covers.

Bridge-pieces, 21, having eyelets in their extremities are fitted between the ears, 19, and pins, 22, secure said bridge-pieces thereto. Central of the respective bridge-pieces screw-shanked hand wheels, 23, are provided for rendering the covers hermetically tight. It will be obvious that by removing a pin, 22, on either side of a cover the remaining pin on the opposite side would form a pintle to a hinge from which both said bridge-piece and cover would swing.

Having, therefore, set forth my invention, what I claim as new and desire to secure by Letters Patent, is:

1. In a steam cooker, the combination with a rotary body having an inlet and a discharge opening, of a steam inlet and a steam discharge pipe axially entering said body from opposite parts thereof, a perforated steam distributing tube connecting said inlet and discharge pipes within said body, said tube having a transversely-formed wall or partition near one end thereof dividing the same into chambers, one of said chambers adapted to distribute steam from without said body, the other chamber adapted to conduct steam to said discharge pipe, and a series of agitating vanes arranged within and on the walls of said body.

2. In a steam cooker, the combination with a cylindrical rotary body, of a steam inlet and a steam discharge pipe axially entering said body from opposite ends thereof, a series of spirally-disposed vanes arranged within and on said body longitudinally thereof, said vanes being terminated longitudinally of said body by an open space, said body having an inlet and a discharge opening alined within said open space within the outer shell or wall thereof, and a head of said body having a man-hole in alinement with said open space and near said inlet and discharge opening, substantially as and for the purpose set forth.

3. In a steam cooker, the combination with a cylindrical rotary body, of a steam inlet and a steam discharge pipe axially entering said body from opposite ends thereof, a two-compartment longitudinally-perforated distributing tube connecting said inlet and discharge pipes within said body, a series of spirally-disposed vanes arranged within and on said body longitudinally thereof, said vanes being terminated longitudinally of said body by an open space, the outer or cylindrical shell of said body having a filling and discharge opening, and the outer end or head of said body having a man-hole, both said filling and discharge opening and said man-holes being in alinement with said open space, substantially as, and for the purpose set forth.

JOSEF C. PRIMS.

Witnesses:
B. R. PARRISH,
I. W. SCHRAM.